United States Patent [19]

Young

[11] 4,249,963

[45] Feb. 10, 1981

[54] METHOD FOR IMPROVING A PROPERTY OF AN ALLOY

[75] Inventor: William R. Young, Cincinnati, Ohio

[73] Assignee: General Electric Company, Cincinnati, Ohio

[21] Appl. No.: 59,796

[22] Filed: Jul. 23, 1979

[51] Int. Cl.³ .......................... C21D 1/74; C22F 1/02
[52] U.S. Cl. ..................................... 148/16; 148/20.3; 148/127
[58] Field of Search .................... 148/16, 20.3, 127

[56] References Cited

U.S. PATENT DOCUMENTS

| | | | |
|---|---|---|---|
| 3,215,566 | 11/1965 | Mayer | 148/20.3 |
| 3,859,145 | 1/1975 | McGlasson et al. | 148/20.3 |
| 4,098,450 | 7/1978 | Keller et al. | 228/119 |

*Primary Examiner*—R. Dean

*Attorney, Agent, or Firm*—Lee H. Sachs; Derek P. Lawrence

[57] ABSTRACT

A property, such as ductility, mechanical strength and increased remelt temperature, of an alloy, for example one which includes an element such as Si or B, or both, is improved by depletion of such an element through the alloy surface. This is accomplished by exposing the alloy surface, one common form of which is a brazing alloy, to gaseous ions such as fluoride ions, while heating the alloy at a temperature which is not detrimental to the alloy or members associated with the alloy. Heating is conducted for a time sufficient for such elements, for example those selected from Si and B, included as a melting point depressant, to diffuse to the surface of the alloy and to react with the gaseous ions to form a gaseous compound of the element. Such gaseous compound then separates from the surface, thereby depleting the alloy of the element and improving at least one property.

1 Claim, No Drawings

METHOD FOR IMPROVING A PROPERTY OF AN ALLOY

FIELD OF THE INVENTION

This invention relates to processing of metal alloys and, more particularly, to the processing of metal articles including alloys, particularly those based on Fe, Co or Ni and which include elements selected from Si and B, frequently used as melting point depressants.

BACKGROUND OF THE INVENTION

The high temperature brazing alloys based on Ni, Co or Fe, commonly used in joining or treating gas turbine engine components, have experienced certain undesirable properties when compared with the properties of the alloy of members with which they are associated, such as in joining. These properties include lower room and elevated temperature ductility, a significantly lower remelt temperature and lower mechanical strength properties. The deleterious properties of one form of the alloys to which the present invention relates are the direct result of B or Si, or both, additions necessary to reduce the alloy melting temperature to below that of the alloy of the members being processed.

During evaluation of the method described in U.S. Pat. No. 4,098,450 - Keller et al., issued July 4, 1978 and assigned to the assignee of the present invention, it was recognized that such elements as B and Si form volatile fluoride compounds when exposed to a fluoride ion atmosphere at elevated temperatures. The disclosure of such Keller et al. patent is incorporated herein by reference.

SUMMARY OF THE INVENTION

It is a principal object of the present invention to provide a method for overcoming the detrimental effect of temperature depressant elements, such as those selected from Si and B, on alloy properties such as ductility, mechanical strenth and remelt temperature.

A more specific object is to provide such a method for improving the properties of a high temperatue brazing alloy based on an element selected from Fe, Co or Ni after the brazing alloy hs been used and is bonded within an article.

These and other objects and advantages will be more clearly understood from the following detailed description and the examples, all of which are intended to be representative of rather than in any way limiting on the scope of the present invention.

Briefly, the method of the present invention improves a property of an alloy through depletion of at least one element of the alloy through an alloy surface. Such an alloy typically can be a brazing alloy, for example, including a temperature depressant element such as those selected from Si and B and is used in the fabrication of an article. The method comprises the steps of exposing the alloy surface to gaseous ions, such as fluoride ions, with which the element will react to form a gaseous compound, while heating the alloy at a temperature below that which is detrimental to the alloy or to associated members. Heating is conducted for a time sufficient for such elements as those selected from Si and B to diffuse to the surface of the alloy and to react with the gaseous ions to form a gaseous compound of the element or elements. The gaseous compound separates from the surface, thereby depleting the alloy of the element.

In a more specific, preferred form, the present invention involves exposing a fabrication including a high temperature brazing alloy based on an element selected from Fe, Co or Ni and including a temperature depressant element selected from Si and B, to gaseous fluoride ions while heating generally at or below the brazing alloy's melting temperature but less than at temperature which will affect detrimentally properties of associated members.

DESCRIPTION OF THE PREFERRED EMBODIMENTS

High temperature brazing alloys, such as those based on iron, nickel or cobalt, have been used in the fabrication of gas turbine engine components for many years. Such brazing alloys are required to have certain high temperature properties and thus they include elements which tend to increase the brazing temperature of the alloys. However, they typically include melting point depressants such as Si and B which lower the brazing temperature to a practical point and which, during brazing, can diffuse into the structure of the components being joined. Such diffusion tends to increase the remelt temperature of the brazed joint. However, undesirable characteristics of the brazed joints include reduced room and elevated temperature ductility and mechanical strength properties lower than that of the structural alloys of the components being joined or proceesed. Also, their remelt temperature generally is several hundred degrees lower than such structural alloys. The continued presence of such temperature depressants, such as boron or silicon or both, generate such undesirable characteristics.

Attempts have been made to use other temperature depressants such as Mg or Mn because of their higher vapor pressure. However, alloys including such depressants were difficult to formulate, at least partly due to the differences in vapor pressures between the principal elements of the brazing alloy and the temperature depressants. Also, melting and flow were difficult to control because such temperature depressants were vaporizing continually. The resulting solidified structure included entrapped voids. In addition, the large amount of volatile elements emitted from the brazing alloy coated furnace structures, resulting in significant operating difficulties.

Attempts to minimize the effect of temperature depressants have included the provision of mixtures of brazing alloys and higher melting point elements or alloy powders. These frequently have been referred to as wide-gap brazing alloys. Although such brazing mixtures reduce the amount of temperature depressants required in the alloys, they do not reduce the absolute amount of temperature depressants which remain and which produce detrimental properties.

The present invention provides a method which reduces the absolute amount of such temperature deressants as Si and B by providing about the alloy an atmosphere of ions with which the temperature depressants will react to form a gaseous compound which separates from the surface of the alloy. The processing temperature is selected in a range which will allow diffusion of the temperature depressants to the surface of the alloy and yet be below a temperature which detrimentally affects associated alloy structures, such as those bonded at a brazed joint or adjacent to cracks filled with a brazing alloy. In this way, the brazing alloy is depleted of the element or elements which, after brazing, can be undesirable, and the remaining brazed alloy structure is improved in ductility, remelt temperature and mechanical strength properties.

One type of gaseous ion atmosphere which has been found to be particularly useful in the practice of the method of the present invention is the gaseous fluoride ion of the type generated in the method described in the above-incorporated Keller et al. patent. During the evaluation of such method, it was recognized that boron and silicon were depleted from the surface of brazed joints in a gas turbine engine component. Further, as exposure was continued, additional boron or silicon diffused toward the depleted surface in accordance with solid-state diffusion principles in the presence of a concentration gradient. Such a reaction can also occur in the fluoride atmosphere if the alloy is in the molten or semimolten condition. Thus, according to the present invention, depletion of elements such as boron and silicon from the surface of an alloy such as a brazing alloy is limited only by the diffusion time required to achieve the degree of depletion desired. Although the present invention is more practically conducted at temperatures below that at which the brazing alloy is molten or semimolten because of the problems of maintaining article integrity and alignment, it should be understood that the present invention can be practiced at temperatures below that at which the properties of the structural alloy of the article being processed are detrimentally affected.

In more specific examples, the present invention was demonstrated by exposing commercially available brazing alloy foils of various brazing alloys to a fluoride ion environment at 1800° F. for one hour in the manner described in the Keller et al. patent. In each case, the brazing alloy remelt temperature was increased significantly, as shown by data in the following table:

TABLE

| Brazing Alloy Composition (nominal wt. %) | Normal Melting Point (°F.) | Test temp. after Fluoride Ion Exposure | Minimum Increase in Melting Point (°F.) |
|---|---|---|---|
| Ni, 7Cr, 3Fe, 4Si, 3B | 1865-1920 | 2300 | 380-438 |
| Ni, 3.1B, 4.5Si | 1850 | 2350 | 500 |
| Ni, 1.8B, 3.5Si | 1935 | 2300 | 365 |
| Ni, 19Cr, 10Si | 2060 | 2340 | 280 |
| Ni, 18Cr, 8Si | 2100 | 2350 | 250 |

P Ductility was determined from specimens by brazing a surface layer of the above-identified Ni, 7Cr, 3Fe, 4Si, 3B alloy (AMS 4777) onto a nominally 0.042 inch thick base material commercially available as Hastelloy X alloy and nominally consisting, by weight, of 22% Cr, 1.5% Co, 9% Mo, 0.6% W, 18.5% Fe, with the balance Ni. The brazing was conducted at a temperature of 1925° F. This resulted in a surface layer of AMS 4777 alloy which varied in thickness from 0.005 to 0.010 inches, generally. Two each of these specimens were exposed to a fluoride ion atmosphere for one hour at 1800° F., and two hours at 1800° F. Two each additional specimens were used as control specimens in the as-brazed condition and vacuum heat treated at 1800° F. The specimens were then subjected to 2T bend tests, bend radius r equals 2 times T, where T=material thickness. Bend tests were conducted at room temperature with the braze surface layer in tension. The control specimens in the as-brazed and vacuum heat treated condition exhibited significant braze cracking. The specimens exposed to fluoride ion atmosphere for one hour exhibited cracking. The specimens exposed to the fluoride ion atmosphere for two hours exhibited full bend ductility. The depletion of silicon and boron was confirmed by metallographic examination and extended to a depth of approximately 0.004-inch into the AMS 4777 alloy layer.

This invention was further demonstrated by exposing a gas turbine engine high pressure turbrine nozzle to a fluoride ion environment at 1800° F. for two hours. In this example, the nozzlehad been fabricated from the following commercially available base materials identified by alloy name and nominal weight percent composition: Rene' 77 (15Co, 14Cr, B 4.2Mo, 4.3Al, 3.4Ti, balance Ni); TD Ni Cr (21Cr, 2.7 $ThO_2$, balance Ni); Inconel 600 (8Fe, 15Cr, balance Ni); HS 188 (22Ni, 3.5Fe, 22Cr, 2Mn, 15.5W, 0.09La, balance Co); and Inconel 625 (5Fe, 21.5Cr, 9Mo, 3.6Ta/Cb, balance Ni). The following commercially available brazing alloys were utilized to fabricate this structure and are identified by name and nominal weight percent composition: TD6 (15.5Cr, 16Mo, 4W, 6Fe, 4Si, balance Ni - brazing temperature 2375° F); and TD50(20.5Cr, 8.5Mo, 20.5Fe, 10Si, balance Ni - brazing temperature 2175° F.).

It was necessary to subject this component to a temperature of 2200° F. for times up to four hours, in vacuum. Prior to the present invention, this exposure would have resulted in extensive remelting and flow of at least one of the brazing alloys. After exposure to the above-described fluoride ion environment, no remelting or flow of these alloys was observed during the subsequent thermal cycle at 2200° F.

Although the present invention has been described in connection with specific examples and embodiments, it will be recognized by those skilled in the art that the present invention is capable of variations and modifications without departing from its scope represented by the appended claims.

What is claimed is:

1. A method for improving a property of an article fabricated with a high temperature brazing alloy based on an element selected from the group consisting of Fe, Co and Ni, the brazing alloy including at least one melting point depressant element selected from the group consisting of Si and B, by depletion of the depressant element through a brazing alloy surface, comprising the steps of:

exposing the alloy surface to gaseous fluoride ions with which the depressant element will react to form a gaseous compound, while heating the brazing alloy at a temperature less than that which will affect detrimentally material of the article and generally at or below the brazing alloy melting temperature, for a time sufficient for the depressant element to diffuse to the alloy surface and to react with the gaseous fluoride ions to form a gaseous fluoride compound of the element, the gaseous compound separating from the surface, thereby to deplete the alloy of the element.

* * * * *